US011474873B2

(12) United States Patent
Biernat et al.

(10) Patent No.: US 11,474,873 B2
(45) Date of Patent: Oct. 18, 2022

(54) IMPLEMENTING SERVERLESS FUNCTIONS USING CONTAINER ORCHESTRATION SYSTEMS AND OPERATIONAL TECHNOLOGY DEVICES

(71) Applicant: ROCKWELL AUTOMATION TECHNOLOGIES, INC., Mayfield Heights, OH (US)

(72) Inventors: Tim Biernat, Franklin, WI (US); Nathaniel S. Sandler, Chagrin, OH (US); James J. Kay, Chardon, OH (US); David A. Johnston, Painesville, OH (US); Karl Staas, Willoughby, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 2 days.

(21) Appl. No.: 17/028,726

(22) Filed: Sep. 22, 2020

(65) Prior Publication Data
US 2022/0091899 A1   Mar. 24, 2022

(51) Int. Cl.
*G06F 9/50* (2006.01)
*G06F 9/48* (2006.01)
*G06F 9/54* (2006.01)

(52) U.S. Cl.
CPC .......... *G06F 9/5077* (2013.01); *G06F 9/4856* (2013.01); *G06F 9/5072* (2013.01); *G06F 9/542* (2013.01)

(58) Field of Classification Search
CPC .................................................. G06F 9/5077
See application file for complete search history.

(56) References Cited

U.S. PATENT DOCUMENTS

| | | | |
|---|---|---|---|
| 2018/0024537 A1 | 1/2018 | Chauvet et al. | |
| 2019/0377604 A1 | 12/2019 | Cybulski | |
| 2020/0136906 A1 | 4/2020 | Bernat et al. | |
| 2020/0278892 A1 | 9/2020 | Nainar et al. | |
| 2020/0311617 A1* | 10/2020 | Swan | G06F 9/45558 |

(Continued)

FOREIGN PATENT DOCUMENTS

| | | |
|---|---|---|
| KR | 20200027783 A | 3/2020 |
| WO | 2020184362 A1 | 9/2020 |

OTHER PUBLICATIONS

Extended European Search Report for European Patent Application No. 21179775.8, dated Nov. 25, 2021, 9 pages.

(Continued)

*Primary Examiner* — Charlie Sun
(74) *Attorney, Agent, or Firm* — Fletcher Yoder, P.C.

(57) ABSTRACT

A method may include receiving, via a first computing node of a cluster of computing nodes in a container orchestration system, a pod from a second computing node in the cluster of computing nodes. The method may also include retrieving an image file comprising one or more containers from a registry, such that the pod may include an indication of a location of the image file in the registry. The one or more containers may include one or more pre-analytic operations for a control system of a plurality of control systems to perform. The method may then involve generating a package based on the one or more containers and storing the package in a filesystem shared with the control system.

20 Claims, 6 Drawing Sheets

(56) References Cited

U.S. PATENT DOCUMENTS

2022/0027217 A1* 1/2022 Thoemmes ............. G06F 9/542

OTHER PUBLICATIONS

Partial European Search Report for European Patent Application No. 21180068.5, dated Dec. 8, 2021, 17 pages.
Marshall, "Industry 4.0: The PLC evolves from Controller to Cloud Interface," Feb. 9, 2018, https://www.rs-online.com/designspark/evolution-of-the-industrial-plcfrom-controller-to-cloud-interface, retrieved on Nov. 29, 2021, pp. 1-6.
European Search Report for European Patent Application No. 21180068.5, dated Mar. 28, 2022, 19 Pages.
Anonymous, "Pull an Image from a Private Registry", Kubernetes, retrieved on Mar. 18, 2022, 5 Pages, https://web.archive.org/web/20171003051312/https://kubernetes.io/docs/tasks/configure-pod-container/pull-image-private-registry/.
European Search Report for European Patent Application No. 21180279.8, dated Apr. 19, 2022, 12 Pages.

* cited by examiner

IMPLEMENTING SERVERLESS FUNCTIONS USING CONTAINER ORCHESTRATION SYSTEMS AND OPERATIONAL TECHNOLOGY DEVICES

BACKGROUND

This disclosure relates generally to systems and methods for implementing a container orchestration system in an operational technology (OT) or an industrial platform. More particularly, embodiments of the present disclosure are related to systems and methods for leveraging container orchestration systems to coordinate operations of OT devices.

Industrial automation systems are managed and operated using automation control and monitoring systems (e.g., industrial control system), particularly in industrial automation environments. Such applications may include controlling a wide range of components, such as valves, electric motors, and so forth, and the collection of data via sensors. Typical industrial control systems may include one or more components, such as programming terminals, automation controllers, input/output (I/O) modules, communication networks, human-machine interface (HMI) terminals, and the like.

Generally, industrial control systems operate in the OT environment are used to control industrial devices accessible via an OT network. Although the industrial control systems may be used to manage the operations of the devices within the OT network, improved systems and methods for operating devices within the OT network are desirable. For example, certain technologies available in the information technology (IT) environment may provide certain industrial control system users additional management tools that they employ for operating their IT assets.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include a plurality of control systems for controlling a plurality of operations of a plurality of operational technology (OT) devices. The system may also include a first computing node of a cluster of computing nodes that are part of a container orchestration system. The first computing node may receive an event-based notification from a second computing node of the cluster of nodes, such that the second computing node is associated with a first control system of the plurality of control systems and a first OT device of the plurality of OT devices. The first computing node may then determine one or more analytic operations to be performed based on the event-based notification, determine one or more pre-analytic operations to be performed by one or more of the plurality of control systems based on the one or more analytic operations, and retrieve a plurality of machine state datasets from the plurality of control systems via a portion of the cluster of computing nodes. Each of the plurality of machine state datasets correspond to an operational state associated with each of the plurality of control systems, each of the plurality of OT devices, or both. The first computing node may then identify a second control system as a suitable host to perform the one or more pre-analytic operations based on the plurality of machine state datasets and transmit a pod to a third computing node associated with the second control system. The pod may cause the third computing node to perform the one or more pre-analytic operations.

In another embodiment, a method may include receiving, via a first computing node of a cluster of computing nodes in a container orchestration system, a pod from a second computing node in the cluster of computing nodes. The method may also include retrieving an image file comprising one or more containers from a registry, such that the pod may include an indication of a location of the image file in the registry. The one or more containers may include one or more pre-analytic operations for a control system of a plurality of control systems to perform. The method may then involve generating a package based on the one or more containers and storing the package in a filesystem shared with the control system.

In yet another embodiment, a non-transitory computer-readable medium may include computer-executable instructions that, when executed, cause a processor to receive an event-based notification from a first computing node of a cluster of nodes that are part of a container orchestration system, such that the first computing node is associated with a first control system of a plurality of control systems and a first OT device of a plurality of operational technology (OT) devices operating in an industrial system. The processor may then determine a first set operations to be performed based on the event-based notification, determine a second set of operations to be performed by one or more of the plurality of control systems based on the first set of operations, and retrieve a plurality of machine state datasets from the plurality of control systems via a portion of the cluster of computing nodes. Each of the plurality of machine state datasets correspond to an operational state associated with each of the plurality of control systems, each of the plurality of OT devices, or both. The processor may then identify a second control system as a suitable host to perform the second set of operations based on the plurality of machine state datasets and transmit a pod to a second computing node associated with the second control system. The pod may cause the second computing node to perform the second set of operations.

DRAWINGS

These and other features, aspects, and advantages of the present embodiments will become better understood when the following detailed description is read with reference to the accompanying drawings in which like characters represent like parts throughout the drawings, wherein.

DETAILED DESCRIPTION

Figure 1:
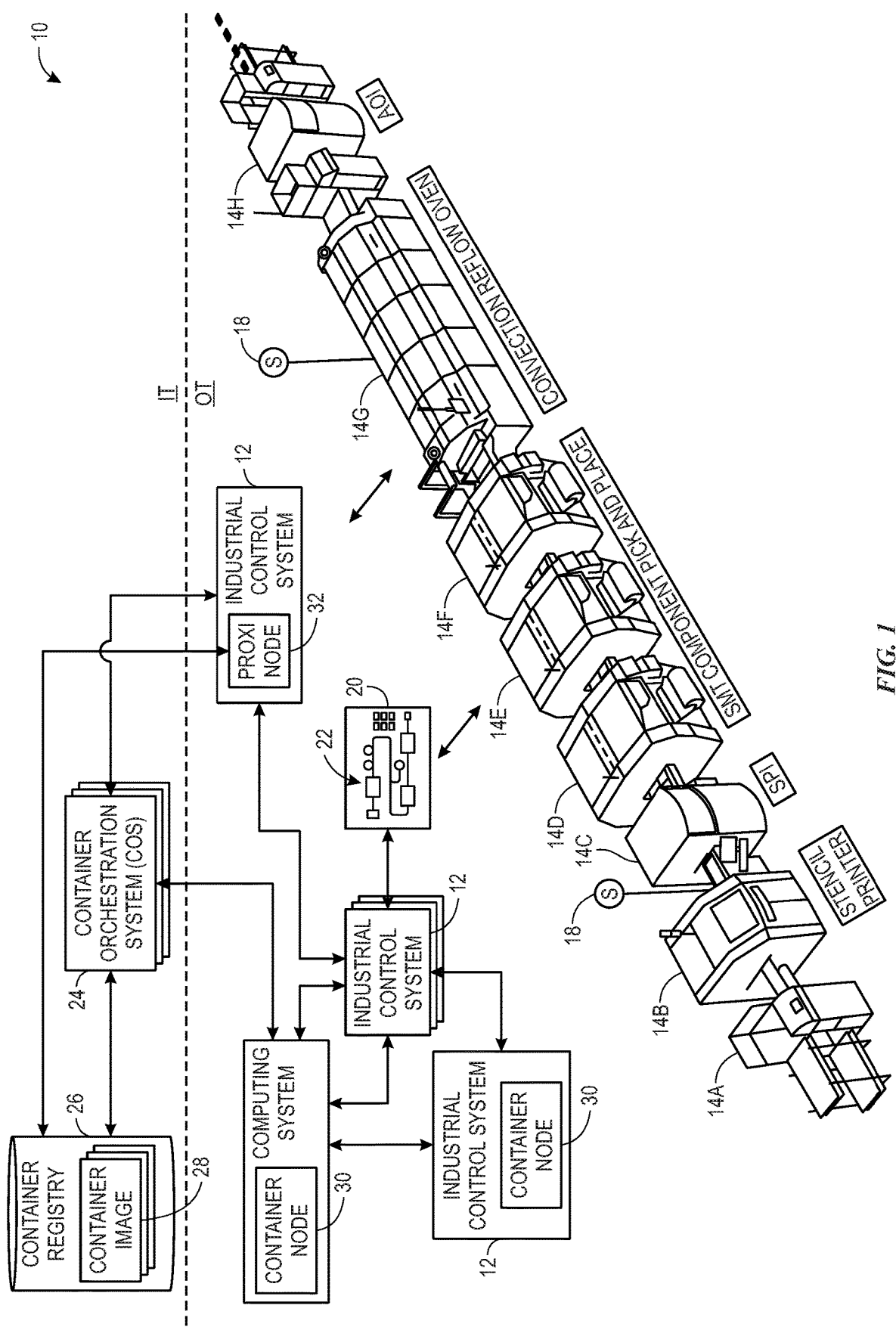
FIG. 1 is a perspective view of an example industrial automation system, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

The present disclosure is generally directed to coordinating operations of devices that are part of an operation technology (OT) system using information technology (IT) systems. As mentioned above, industrial control systems may be used to control and manage operations of devices that are part of the OT system. However, operators of these industrial automation systems may benefit from managing assets, such as programmable logic controllers (PLCs), that are part of the OT network using similar processes provided by information technology systems. By way of example, container orchestration systems may be used in IT systems to manage IT assets. That is, certain IT systems may leverage software containers (e.g., operating system level virtualization) in conjunction with container orchestration systems (e.g., Docker, Kubernetes) to coordinate the construction and deployment of various containers across a number of computing resources. Indeed, containers may include standard units of software that packages code and its dependencies, such that a container node may execute the application stored in the container regardless of the computing environment or infrastructure. As a result, multiple containers can run on the same machine and share an operating system kernel with other containers, such that each container is running as an isolated process in the respective machine. In this way, container orchestration systems that operate in the IT environment build application services operate across multiple computing resources, such that certain applications (e.g., packaged as software containers) may be automatically deployed, scaled, and managed in the same machine or across multiple machines in disparate computing environments.

With this in mind, using container orchestration systems to manage the operations of OT assets may realize many advantages including large scale application deployment, providing updates from managed registries, providing high availability using standby and backup container replicas in different OT assets, and the like. However, OT assets may not be accessible to container orchestration systems, which rely on certain operating systems that are distinct from the operating systems that control the OT assets. Instead, OT assets may be individually programmed and managed by a respective design tool operating in the OT space. For many industrial applications, particularly in the process automation space, a distributed industrial control system may provide multiple remote-control nodes that may access or interface with these OT assets via an OT network. However, the container orchestration systems are not capable to access the remote-control nodes via this OT network to manage these distributed OT assets in the same way they manage their networked IT assets in terms of provisioning, deploying, operating and maintaining the assets throughout their respective lifecycles.

Keeping the foregoing in mind, in certain embodiments, specialized hardware and/or software control systems may be integrated into industrial control systems that operate in the OT space, such that the control systems native to the OT assets may participate in orchestration operations. For example, in one embodiment, the control system may be configured as a worker node that may support a limited number of operations or commands provided by the container orchestration system. That is, the worker node may include an application programming interface (API) that supports receiving certain communications from a master node of the container orchestration system, parsing the communications to determine the requested commands, mapping the requested commands to OT asset commands, and sending the OT asset commands to the respective OT asset.

In another embodiment, a separate computing system may operate using an operating system (e.g., Linux) that enables the computing system to operate as a proxy node that is part of the container orchestration system cluster. In this way, the proxy node may be programmed to execute a container daemon that enables the proxy node to receive containers stored in a container registry and deploy the containers at scale to one or more control systems that control operations of one or more respective OT assets. When deployed in this fashion, the control systems (e.g., controllers) of the respective OT assets may unpack container content, such that the container content may be verified and loaded by the respective control system for execution. In addition, the proxy nodes may provide a bi-directional bridge for coordinating between the OT assets and a master node of the container orchestration system. That is, the proxy node may share state data associated with a control system of an OT asset with the master node of the container orchestration system. Moreover, since the proxy node provides the master node with a view of the operational states of the respective OT asset, the master node may include the OT asset in it scheduling operations to maintain the desired states of a collection of OT assets.

In any case, the embodiments described herein provide systems and method for using industrial control systems (e.g., controllers) that are capable of controlling operations of OT assets in the industrial automation system and participating as a work node or proxy node in a container orchestration system. As such, a more efficient use of OT assets may be coordinated by the container orchestration system, which may automatically control the processes that compose one or more applications across multiple OT assets. The container orchestration system may thus provide services for OT asset managers, such as automatic updates, health monitoring, failover procedures, system resource coordination, and the like, while ensuring that the OT assets continue to perform their respective operations in the industrial automation system. Additional details with regard to coordinating the operations of the container orchestration system with industrial control systems that control OT assets will be discussed below with reference to FIGS. 1-8.

By way of introduction, FIG. 1 is a perspective view of an example industrial automation system 10 controlled by one or more industrial control systems 12. The industrial automation system 10 includes stations 14 having machine components and/or machines to conduct functions within an automated process, such as silicon wafer manufacturing, as is depicted. The automated process may begin at a station 14A used for loading objects, such as substrates, into the industrial automation system 10 via a conveyor section 16. The conveyor section 16 may transport the objects to a station 14B to perform a first action, such a printing solder paste to the substrate via stenciling. As objects exit from the station 14B, the conveyor section 16 may transport the objects to a station 14C for solder paste inspection (SPI) to inspect printer results, to a station 14D, 14E, and 14F for surface mount technology (SMT) component placement, to a station 14G for convection reflow oven to melt the solder to make electrical couplings, and finally to a station 14H for automated optical inspection (AOI) to inspect the object manufactured (e.g., the manufactured printed circuit board). After the objects proceed through the various stations, the objects may be removed from the station 14H, for example, for storage in a warehouse or for shipment. Clearly, for other applications, the particular system, machine components, machines, stations, and/or conveyors may be different or specially adapted to the application.

For example, the industrial automation system 10 may include machinery to perform various operations in a compressor station, an oil refinery, a batch operation for making food items, chemical processing operations, brewery operations, mining operations, a mechanized assembly line, and so forth. Accordingly, the industrial automation system 10 may include a variety of operational components, such as electric motors, valves, actuators, temperature elements, pressure sensors, or a myriad of machinery or devices used for manufacturing, processing, material handling, and other applications. The industrial automation system 10 may also include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation system 10 may also include motors, protection devices, switchgear, compressors, and the like. Each of these described operational components may correspond to and/or generate a variety of operational technology (OT) data regarding operation, status, sensor data, operational modes, alarm conditions, or the like, that may be desirable to output for analysis with IT data from an IT network, for storage in an IT network, for analysis with expected operation set points (e.g., thresholds), or the like.

In certain embodiments, one or more properties of the industrial automation system 10 equipment, such as the stations 14, may be monitored and controlled by the industrial control systems 12 for regulating control variables. For example, sensing devices (e.g., sensors 18) may monitor various properties of the industrial automation system 10 and may be used by the industrial control systems 12 at least in part in adjusting operations of the industrial automation system 10 (e.g., as part of a control loop). In some cases, the industrial automation system 10 may be associated with devices used by other equipment. For instance, scanners, gauges, valves, flow meters, and the like may be disposed on or within the industrial automation system 10. Here, the industrial control systems 12 may receive data from the associated devices and use the data to perform their respective operations more efficiently. For example, a controller of the industrial automation system 10 associated with a motor drive may receive data regarding a temperature of a connected motor and may adjust operations of the motor drive based on the data.

The industrial control systems 12 may be communicatively coupled to a display/operator interface 20 (e.g., a human-machine interface (HMI)) and to devices of the industrial automation system 10. It should be understood that any suitable number of industrial control systems 12 may be used in a particular industrial automation system 10 embodiment. The industrial control systems 12 may facilitate representing components of the industrial automation system 10 through programming objects that may be instantiated and executed to provide simulated functionality similar or identical to the actual components, as well as visualization of the components, or both, on the display/operator interface 20. The programming objects may include code and/or instructions stored in the industrial control systems 12 and executed by processing circuitry of the industrial control systems 12. The processing circuitry may communicate with memory circuitry to permit the storage of the component visualizations.

As illustrated, a display/operator interface 20 depicts representations 22 of the components of the industrial automation system 10. The industrial control system 12 may use data transmitted by sensors 18 to update visualizations of the components via changing one or more statuses, states, and/or indications of current operations of the components. These sensors 18 may be any suitable device adapted to provide information regarding process conditions. Indeed, the sensors 18 may be used in a process loop (e.g., control loop) that may be monitored and controlled by the industrial control system 12. As such, a process loop may be activated based on process inputs (e.g., an input from the sensor 18) or direct input from a person via the display/operator interface 20. The person operating and/or monitoring the industrial automation system 10 may reference the display/operator interface 20 to determine various statuses, states, and/or current operations of the industrial automation system 10 and/or for a particular component. Furthermore, the person operating and/or monitoring the industrial automation system 10 may adjust to various components to start, stop, power-down, power-on, or otherwise adjust an operation of one or more components of the industrial automation system 10 through interactions with control panels or various input devices.

The industrial automation system 10 may be considered a data-rich environment with several processes and operations that each respectively generate a variety of data. For example, the industrial automation system 10 may be associated with material data (e.g., data corresponding to substrate or raw material properties or characteristics), parametric data (e.g., data corresponding to machine and/or station performance, such as during operation of the industrial automation system 10), test results data (e.g., data corresponding to various quality control tests performed on a final or intermediate product of the industrial automation system 10), or the like, that may be organized and sorted as OT data. In addition, sensors 18 may gather OT data indicative of one or more operations of the industrial automation system 10 or the industrial control system 12. In this way, the OT data may be analog data or digital data indicative of measurements, statuses, alarms, or the like associated with operation of the industrial automation system 10 or the industrial control system 12.

The industrial control systems 12 described above may operate in an OT space in which OT data is used to monitor and control OT assets, such as the equipment illustrated in the stations 14 of the industrial automation system 10 or other industrial equipment. The OT space, environment, or network generally includes direct monitoring and control operations that are coordinated by the industrial control system 12 and a corresponding OT asset. For example, a programmable logic controller (PLC) may operate in the OT network to control operations of an OT asset (e.g., drive, motor). The industrial control systems 12 may be specifically programmed or configured to communicate directly with the respective OT assets.

A container orchestration system 24, on the other hand, may operate in an information technology (IT) environment. That is, the container orchestration system 24 may include a cluster of multiple computing devices that coordinates an automatic process of managing or scheduling work of individual containers for applications within the computing devices of the cluster. In other words, the container orchestration system 24 may be used to automate various tasks at scale across multiple computing devices. By way of example, the container orchestration system 24 may automate tasks such as configuring and scheduling of containers, provisioning and deployments of containers, determining availability of containers, configuring applications in terms of the containers that they run in, scaling of containers to equally balance application workloads across an infrastructure, allocating resources between containers, performing load balancing, traffic routing and service discovery of containers, performing health monitoring of containers, securing the interactions between containers, and the like. In any case, the container orchestration system 24 may use configuration files to determine a network protocol to facilitate communication between containers, a storage location to save logs, and the like. The container orchestration system 24 may also schedule deployment of containers into clusters and identify a host (e.g., node) that may be best suited for executing the container. After the host is identified, the container orchestration system 24 may manage the lifecycle of the container based on predetermined specifications.

With the foregoing in mind, it should be noted that containers refer to technology for packaging an application along with its runtime dependencies. That is, containers include applications that are decoupled from an underlying host infrastructure (e.g., operating system). By including the run time dependencies with the container, the container may perform in the same manner regardless of the host in which it is operating. In some embodiments, containers may be stored in a container registry 26 as container images 28. The container registry 26 may be any suitable data storage or database that may be accessible to the container orchestration system 24. The container image 28 may correspond to an executable software package that includes the tools and data employed to execute a respective application. That is, the container image 28 may include related code for operating the application, application libraries, system libraries, runtime tools, default values for various settings, and the like.

By way of example, an integrated development environment (IDE) tool may be employed by a user to create a deployment configuration file that specifies a desired state for the collection of nodes of the container orchestration system 24. The deployment configuration file may be stored in the container registry 26 along with the respective container images 28 associated with the deployment configuration file. The deployment configuration file may include a list of different pods and a number of replicas for each pod that should be operating within the container orchestration system 24 at any given time. Each pod may correspond to a logical unit of an application, which may be associated with one or more containers. The container orchestration system 24 may coordinate the distribution and execution of the pods listed in the deployment configuration file, such that the desired state is continuously met. In some embodiments, the container orchestration system 24 may include a master node that retrieves the deployment configuration files from the container registry 26, schedules the deployment of pods to the connected nodes, and ensures that the desired state specified in the deployment configuration file is met. For instance, if a pod stops operating on one node, the master node may receive a notification from the respective worker node that is no longer executing the pod and deploy the pod to another worker node to ensure that the desired state is present across the cluster of nodes.

As mentioned above, the container orchestration system 24 may include a cluster of computing devices, computing systems, or container nodes that may work together to achieve certain specifications or states, as designated in the respective container. In some embodiments, container nodes 30 may be integrated within industrial control systems 12 as shown in FIG. 1. That is, container nodes 30 may be implemented by the industrial control systems 12, such that they appear as worker nodes to the master node in the container orchestration system 24. In this way, the master node of the container orchestration system 24 may send commands to the container nodes 30 that are also configured to perform applications and operations for the respective industrial equipment.

With this in mind, the container nodes 30 may be integrated with the industrial control systems 12, such that they serve as passive-indirect participants, passive-direct participants, or active participants of the container orchestration system 24. As passive-indirect participants, the container nodes 30 may respond to a subset of all of the commands that may be issued by the container orchestration system 24. In this way, the container nodes 30 may support limited container lifecycle features, such as receiving pods, executing the pods, updating a respective filesystem to included software packages for execution by the industrial control system 12, and reporting the status of the pods to the master node of the container orchestration system 24. The limited features implementable by the container nodes 30 that operate in the passive-indirect mode may be limited to commands that the respective industrial control system 12 may implement using native commands that map directly to the commands received by the master node of the container orchestration system 24. Moreover, the container node 30 operating in the passive-indirect mode of operation may not be capable to push the packages or directly control the operation of the industrial control system 12 to execute the package. Instead, the industrial control system 12 may periodically check the file system of the container node 30 and retrieve the new package at that time for execution.

As passive-direct participants, the container nodes 30 may operate as a node that is part of the cluster of nodes for the container orchestration system 24. As such, the container node 30 may support the full container lifecycle features. That is, container node 30 operating in the passive-direct mode may unpack a container image and push the resultant package to the industrial control system 12, such that the industrial control system 12 executes the package in response to receiving it from the container node 30. As such, the container orchestration system 24 may have access to a worker node that may directly implement commands received from the master node onto the industrial control system 12.

In the active participant mode, the container node 30 may include a computing module or system that hosts an operating system (e.g., Linux) that may continuously operate a container host daemon that may participate in the management of container operations. As such, the active participant container node 30 may perform any operations that the master node of the container orchestration system 24 may perform. By including a container node 30 operating in the OT space, the container orchestration system 24 is capable of extending its management operations into the OT space. That is, the container node 30 may provision devices in the OT space, serve as a proxy node 32 to provide bi-directional coordination between the IT space and the OT space, and the like. For instance, the container node 30 operating as the proxy node 32 may intercept orchestration commands and cause industrial control system 12 to implement appropriate machine control routines based on the commands. The industrial control system 12 may confirm the machine state to the proxy node 32, which may then reply to the master node of the container orchestration system 24 on behalf of the industrial control system 12.

Additionally, the industrial control system 12 may share an OT device tree via the proxy node 32. As such, the proxy node 32 may provide the master node with state data, address data, descriptive metadata, versioning data, certificate data, key information, and other relevant parameters concerning the industrial control system 12. Moreover, the proxy node 32 may issue requests targeted to other industrial control systems 12 to control other OT devices. For instance, the proxy node 32 may translate and forward commands to a target OT device using one or more OT communication protocols, may translate and receive replies from the OT devices, and the like. As such, the proxy node 32 may perform health checks, provide configuration updates, send firmware patches, execute key refreshes, and other OT operations for other OT devices.

Figure 2:
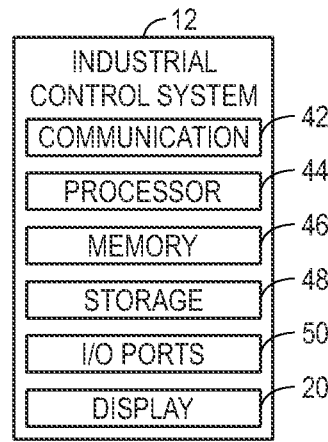
FIG. 2 is a block diagram of an example industrial control system, in accordance with an embodiment.

With the foregoing in mind, FIG. 2 is a block diagram of an example industrial control system 12 that may be used with the embodiments described herein. The industrial control system 12 may include a communication component 42, a processor 44, a memory 46, a storage 48, input/output (I/O) ports 50, a display 20, and the like. The communication component 42 may be a wireless or wired communication component that facilitates communication between the container orchestration system 24 and the industrial control system 12, or any other suitable electronic device. The processor 44 may be any type of computer processor or microprocessor capable of executing computer-executable code. The processor 44 may also include multiple processors that may perform the operations described below.

The memory 46 and the storage 48 may be any suitable article of manufacture that may serve as media to store processor-executable code, data, or the like. These articles of manufacture may represent computer-readable media (i.e., any suitable form of memory or storage) that may store the processor-executable code used by the processor 44 to perform the presently disclosed techniques. The memory 46 and the storage 48 may represent non-transitory computer-readable media (e.g., any suitable form of memory or storage) that may store the processor-executable code used by the processor 44 to perform various techniques described herein. It should be noted that non-transitory merely indicates that the media is tangible and not a signal.

The I/O ports 50 may couple to one or more sensors 18, one or more input devices, one or more displays, or the like to facilitate human or machine interaction with the industrial control system 12. For example, based on a notification provided to a user via a display 20, the user may use an input device to instruct the adjustment of an OT device.

The display 20, as discussed above, may operate to depict visualizations associated with software or executable code being processed by the processor 44. In one embodiment, the display 20 may be a touch display capable of receiving inputs from a user of the industrial control system 12. The display 20 may be any suitable type of display, such as a liquid crystal display (LCD), plasma display, or an organic light emitting diode (OLED) display, for example. Additionally, in one embodiment, the display 20 may be provided in conjunction with a touch-sensitive mechanism (e.g., a touch screen) that may function as part of a control interface for the industrial control system 12.

Although FIG. 2 is depicted with respect to the industrial control system 12, it should be noted that the container orchestration system 24, the container nodes 30, and the proxy node 32 may also include the same or similar components to perform, or facilitate performing, the various techniques described herein. Moreover, it should be understood that the components described with respect to FIG. 2 are exemplary figures and the industrial control system 12 and other suitable computing systems may include additional or fewer components as detailed above.

Figure 3:
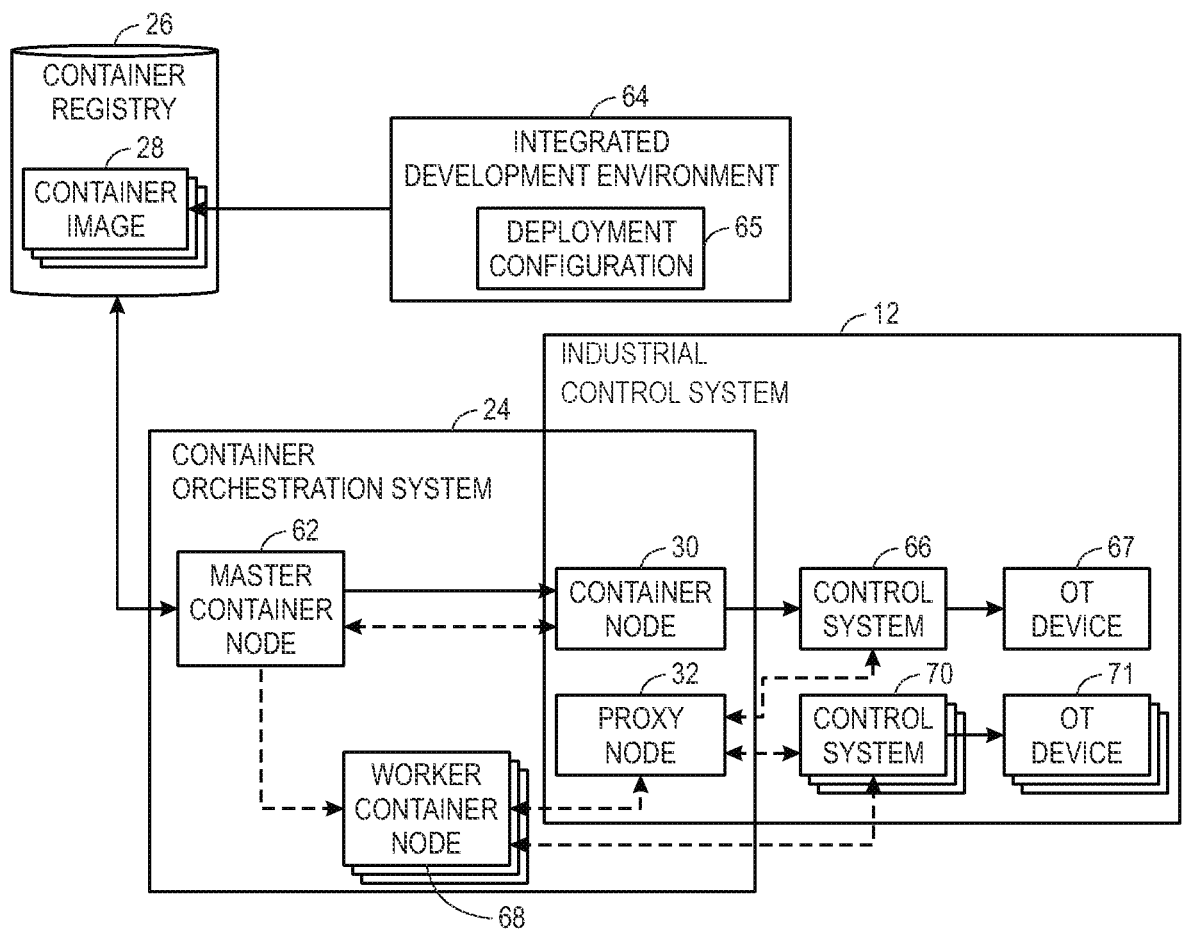
FIG. 3 is a block diagram of an example operational technology (OT) network that coordinates with a container orchestration system, in accordance with an embodiment.

With the foregoing in mind, FIG. 3 illustrates a block diagram that depicts the relative positions of the container node 30 and the proxy node 32 with respect to the container orchestration system 24. As mentioned above, the container orchestration system 24 may include a collection of nodes that are used to achieve a desired state of one or more containers across multiple nodes. As shown in FIG. 3, the container orchestration system 24 may include a master node 62 that may execute control plane processes for the container orchestration system 24. The control plane processes may include the processes that enable the container orchestration system 24 to coordinate operations of the container nodes 30 to meet the desired states. As such, the master node may execute an applications programming interface (API) for the container orchestration system 24, a scheduler component, core resources controllers, and the like. By way of example, the master container node 62 may coordinate all of the interactions between nodes of the cluster that make up the container orchestration system 24. Indeed, the master container node 62 may be responsible for deciding the operations that will run on container nodes 30 including scheduling workloads (e.g., containerized applications), managing the workloads' lifecycle, scaling, and upgrades, managing network and storage resources for the workloads, and the like. The master container node 62 may run an API server to handle requests and status updates received from the container nodes 30.

By way of operation, an integrated development environment (IDE) tool 64 may be used by an operator to develop a deployment configuration file 65. As mentioned above, the deployment configuration file 65 may include details regarding the containers, the pods, constraints for operating the containers/pods, and other information that describe a desired state of the containers specified in the deployment configuration file 65. In some embodiments, the deployment configuration file 65 may be generated in a YAML file, a JSON file, or other suitable file format that is compatible with the container orchestration system 24. After the IDE tool 64 generates the deployment configuration file 65, the IDE tool 64 may transmit the deployment configuration file 65 to the container registry 26, which may store the file along with container images 28 representative of the containers stored in the deployment configuration file 65.

In some embodiments, the master container node 62 may receive the deployment configuration file 65 via the container registry 26, directly from the IDE tool 64, or the like. The master container node 62 may use the deployment configuration file 65 to determine a location to gather the container images 28, determine communication protocols to use to establish networking between container nodes 30, determine locations for mounting storage volumes, locations to store logs for the containers, and the like.

Based on the desired state provided in the deployment configuration file 65, the master container node 62 may deploy containers to the container host nodes 30. That is, the master container node 62 may schedule the deployment of a container based on constraints (e.g., CPU or memory availability) provided in the deployment configuration file 65. After the containers are operating on the container nodes 30, the master container node 62 may manage the lifecycle of the containers to ensure that the containers specified by the deployment configuration file 65 is operating according to the specified constraints and the desired state.

Keeping the foregoing in mind, the industrial control system 12 may not use an operating system (OS) that is compatible with the container orchestration system 24. That is, the container orchestration system 24 may be configured to operate in the IT space that involves the flow of digital information. In contrast, the industrial control system 12 may operate in the OT space that involves managing the operation of physical processes and the machinery used to perform those processes. For example, the OT space may involve communications that are formatted according to OT communication protocols, such as FactoryTalk Live Data, EtherNet/IP. Common Industrial Protocol (CIP), OPC Direct Access (e.g., machine to machine communication protocol for industrial automation developed by the OPC Foundation), or any suitable OT communication protocol (e.g. DNP3, Modbus, Profibus, LonWorks, DALI, BACnet, KNX, EnOcean). Since the industrial control systems 12 operate in the OT space, the industrial control systems are not capable of implementing commands received via the container orchestration system 24.

In certain embodiments, the container node 30 may be programmed or implemented in the industrial control system 12 to serve as a node agent that can register the industrial control system 12 with the master container node 62. For example, the industrial control system 12 may include a programmable logic controller (PLC) that cannot support an operating system (e.g., Linux) for receiving and/or implementing requested operations issued by the container orchestration system 12. However, the PLC may perform certain operations that may be mapped to certain container events. As such, the container node 30 may include software and/or hardware components that may map certain events or commands received from the master container node 62 into actions that may be performed by the PLC. After converting the received command into a command interpretable by the PLC, the container node 30 may forward the mapped command to the PLC that may implement the mapped command. As such, the container node 30 may operate as part of the cluster of nodes that make up the container orchestration system 24, while a control system 66 (e.g., PLC) that coordinates the OT operations for an OT device 67 in the industrial control system 12. The control system 66 may include a controller, such as a programmable logic controller (PLC), a programmable automation controller (PAC), or any other controller that may monitor, control, and operate an industrial automation device or component.

The industrial automation device or component may correspond to an OT device 67. The OT device 67 may include any suitable industrial device that operates in the OT space. As such, the OT device 67 may be involved in adjusting physical processes being implemented via the industrial system 10. In some embodiments, the OT device 67 may include motor control centers, motors, human machine interfaces (HMIs), operator interfaces, contactors, starters, sensors, drives, relays, protection devices, switchgear, compressors, network switches (e.g., Ethernet switches, modular-managed, fixed-managed, service-router, industrial, unmanaged, etc.) and the like. In addition, the OT device 67 may also be related to various industrial equipment such as mixers, machine conveyors, tanks, skids, specialized original equipment manufacturer machines, and the like. The OT device 67 may also be associated with devices used by the equipment such as scanners, gauges, valves, flow meters, and the like. In one embodiment, every aspect of the OT device 67 may be controlled or operated by the control system 66.

In the present embodiments described herein, the control system 66 may thus perform actions based on commands received from the container node 30. By mapping certain container lifecycle states into appropriate corresponding actions implementable by the control system 66, the container node 30 enables program content for the industrial control system 12 to be containerized, published to certain registries, and deployed using the master container node 62, thereby bridging the gap between the IT-based container orchestrations system 24 and the OT-based industrial control system 12.

Figure 4:
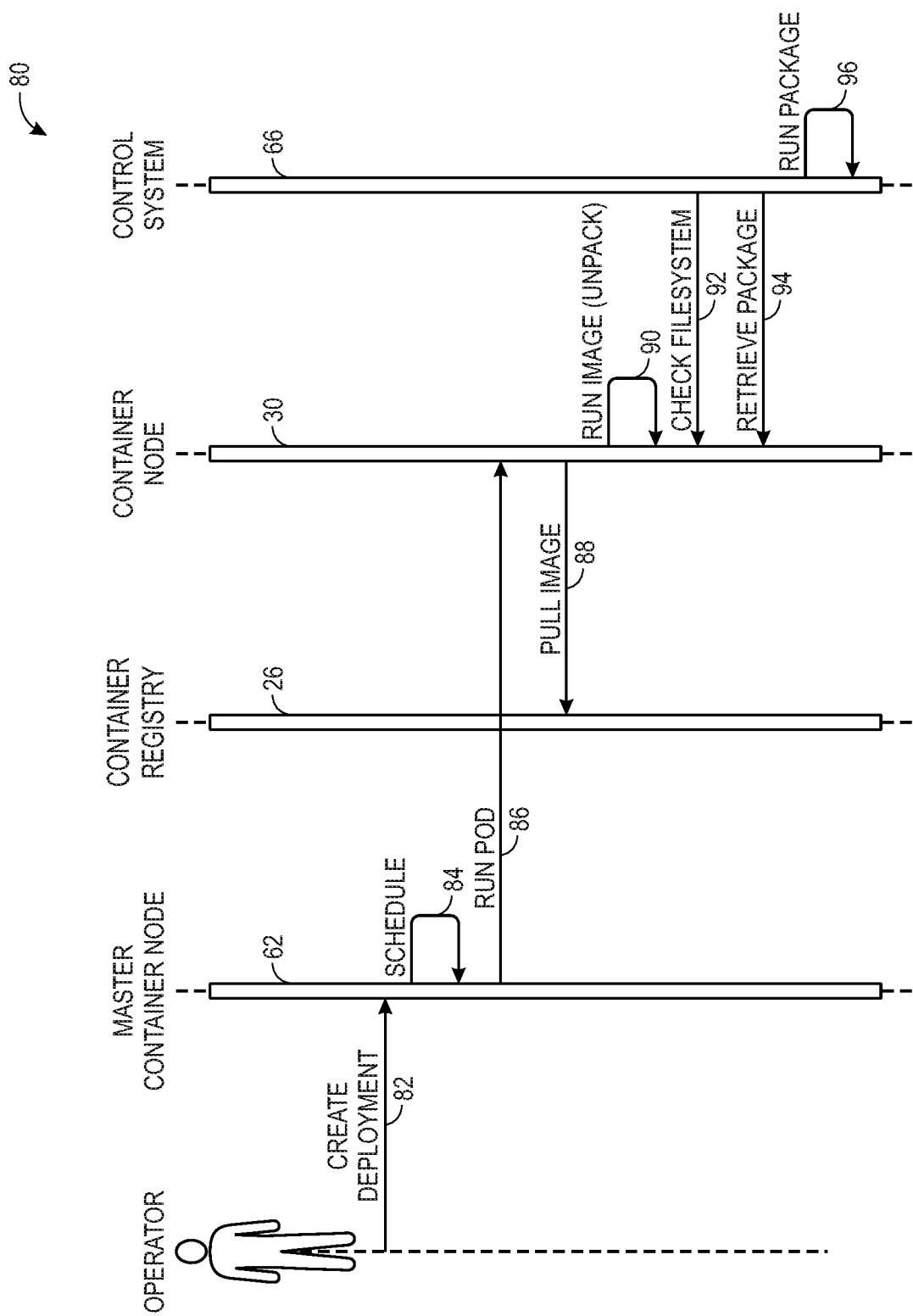
FIG. 4 is a data flow diagram illustrating the deployment of container pods to industrial control systems in the OT network of FIG. 3, in accordance with an embodiment.

FIG. 4 illustrates a data flow diagram 80 that tracks the deployment of a container using the master container node 62 and the container node 30 described above with reference to FIG. 3. At step 82, the IDE tool 64 may create a deployment of the deployment configuration file 65 to the master container node 62. After receiving the deployment configuration file 65, the master container node 62 may identify a container node 30 that may fit the constraint specifications (e.g., memory, CPU availability) provided in the deployment configuration file 65. That is, the master container node 62 performs scheduling operations that involve checking the state data for each node of the container orchestration system 24, determining whether a suitable node exists for the constraints provided in the deployment configuration file 65, and the like.

After identifying the suitable container node, at step 84, the master container node 62 may schedule the deployment of the container to the respective container node 30. At step 86, the master container node 62 may deploy a pod to the container node 30, which may cause the container node 30 to retrieve a container image 28 from the container registry 26 at step 88. In this way, the container node 30 is configured to receive pods from the master container node 62 and execute the pods, although the control system 66 of the industrial control system 12 may not be able to execute the pod. After pulling the container image 28 from the container registry 26, the container node 30 may, at step 90, run the container image 28 or unpack the container image 28 and store an application or operation executable by the control system 66 in a file system. At step 92, the control system 66 may check the file system of the container node 30 for updates or newly stored packages. At step 94, the control system 66 may retrieve the stored package that may include the container scheduled for operation by the control system 66 by the master container node 62 at step 84. At step 96, the control system 66 may execute the package retrieved from the file system of the container node 30. The container node 30 may then monitor the operations of the package being executed on the control system 66, the state (e.g., memory, CPU usage) of the control system 66 and send updates to the master container node 62. If the container node 30 sends an updated indicative of the package no longer executing the package, the master container node 62 may schedule deployment of another pod to another container node 30 for execution to maintain the desired state.

Figure 5:
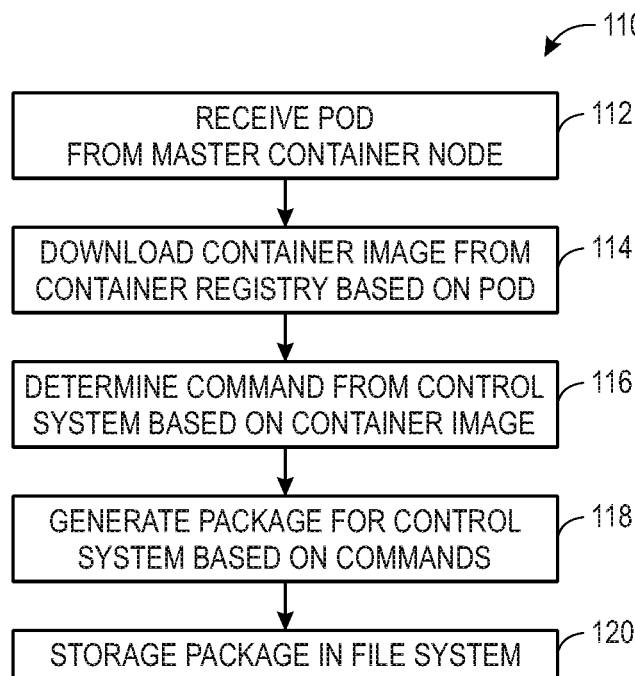
FIG. 5 is a flow chart of a method for the industrial control system passively implementing commands received via the control orchestration system, in accordance with an embodiment.

Keeping the foregoing in mind, FIG. 5 illustrates a method 110 in which the container node 30 may implement to coordinate activities via the master container node 62 of the container orchestration system 24. Although the following description of the method 110 is described as being performed by the container node 30, it should be understood that any suitable container node that is configured to interface with the cluster of nodes of the container orchestration system 24 and the industrial control system 12 may perform the operations described herein. In addition, although the method 110 is described in particular order, it should be understood that the method 110 may be performed in any suitable order.

Referring now to FIG. 5, at block 112, the container node 30 may receive a pod from the master container node 62. As mentioned above, pods may include one or more containers that are deployed to a host (e.g., container node 30). In some embodiments, the pod may operate to specify coordinated operations between a group of containers. The pod may include an indication or reference to a storage location for one or more container images 28 related to the pod. In some embodiments, the container images 28 may be stored in the container registry 26. As such, the pod may provide an indication of a network address or other address for accessing a memory location in the container registry 26.

After receiving the pod from the master container node 62, at block 114, the container node 30 may download the related container images 28 from the container registry 26. The container image 28, as mentioned above, represents data that encapsulates an application and its software dependencies. The container images 28 may be executable software bundles that may execute as standalone software without regard to the operating system that the corresponding container node 30 is using. In some embodiments, the container node 30 may receive the container images directly from the container registry 26, via the master container node 62, or any other suitable communication schemes.

After receiving the container images 28, at block 116, the container node 30 may run or unpack the container images 28 and determine commands that may be performed by the control system 66 based on the container images 28. That is, the container images 28 may include software applications that are executable by container nodes 30. However, the software applications may not be executable by the control system 66. As such, the container node 30 may determine commands for the control system 66 that correspond to the software applications encapsulated in the container images 28. In some embodiments, certain operations in the software applications may be mapped to certain operations that may be performed by the control system 66. For example, software application commands for create, run, start, pause, stop, and delete may map to download, download/run, run, idle, and unload commands, respectively, which may be performed by the control system 66.

After determining the commands that may be implemented by the control system 66 based on the container images 28, at block 118, the container node 30 may generate a package that may be retrieved and executed by the control system 66. That is, the container node 30 may organize or structure the determined commands into a software package that may be used by the control system 66. For example, if the control system 66 corresponds to a PLC, the package may be organized according to a programming structure (e.g. ladder logic) that the PLC may use to program itself.

At block 120, the container node 30 may store the package in a memory or filesystem that is accessible to the control system 66. In some embodiments, the container node 30 may not be capable of interfacing directly with the control system 66. However, the container node 30 may provide the control system 66 with access to its memory or storage components, such that the control system 66 may retrieve the stored package. The control system 66 may be programmed to periodically (e.g., daily, hourly) check the filesystem for updates or new packages available for downloading.

It should be noted that the method 110 may describe a passive-indirect mode of operation for the container node 30 as part of the container orchestration system 24. That is, the container node 30 is limited to performing a subset of commands that may be provided by the master container node 62, as opposed to performing all of the commands that nodes that are part of the container orchestration system 24 are capable of performing. Moreover, the container node 30 may not be able to perform all of the lifecycle operations provided in a container. For example, the container node 30 may facilitate a package download operation for the control system 66, as described above, but it may not be able to perform every function specified in the container if the control system 66 does not have a corresponding operation that can be mapped to the respective container lifecycle operation.

In some embodiments, the container node 30 may operate in a passive-direct mode of operation in which the container node 30 may participate as a node in the container orchestration system 24. As such, the container node 30 may support a full set of container lifecycle operations. That is, since the control system 66 may be capable of implementing a limited set of commands provided by the master container node 62, the container node 30 may be implemented or executed by a sidecar compute module that may host a container host daemon that may perform the full suite of operations that a node in the container orchestration system 24 may perform. As such, the sidecar compute module may be any suitable computing system that is capable of executing an operating system (OS), such that commands received from the master container node 62 may be implemented by the respective sidecar compute module.

By implementing the container node 30 in the sidecar compute module, the container node 30 may be operating as a node that is part of the container orchestration system 24 but operating in the OT space. As a result, the container node 30 may extend the functions available via the container orchestration system 24 to OT devices 67 that are not typically visible to the master container node 62 of the container orchestration system 24. To operate in the passive-direct mode, the container node 30 may include applications and/or APIs that interface directly with the control system 66 and the master container node 62. As such, the container node 30 may provide a bi-directional bridge of communication between the control system 66 and the master container node 62. In some embodiments, the container node 30 may include an API that translates the OT data received from the control system 66 into IT data that may be interpretable by the master container node 62. As such, the container node 30 may provide the master container node 62 with visibility into the operations and states of the OT devices 67 operating in the OT space.

Figure 6:
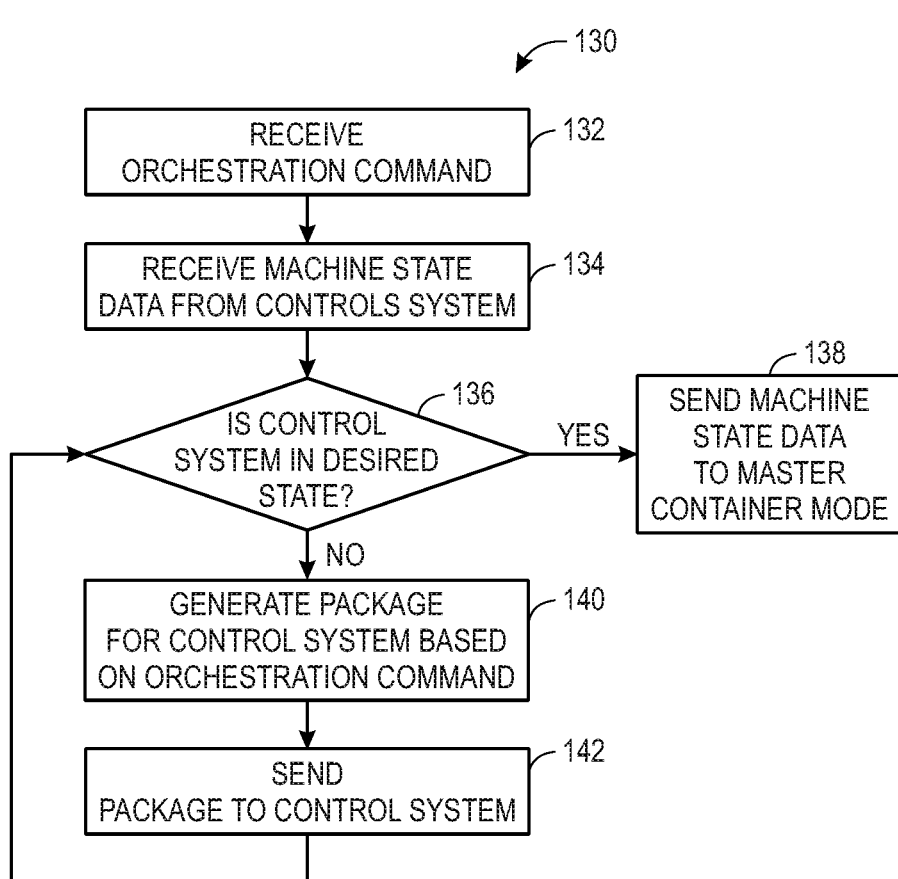
FIG. 6 is a flow chart of a method for the industrial control system actively implementing commands received via the control orchestration system, in accordance with an embodiment.

With this in mind, FIG. 6 illustrates a method 130 for the container node 30 directly sending packages to the control system 66 and machine state data to the master container node 62 in accordance with embodiments described herein. Like the method 110 described above, the following description of the method 130 may be performed by any suitable computing system and any suitable order. It should be noted that the method 130 described below corresponds to operating the container node 30 in the passive-direct mode of operation. As such, the container node 30 may receive and interpret orchestration commands received from the master container node 62 or the like and directly interface with the control system 66 to verify that the control system 66 is operating at the desired state.

Referring to FIG. 6, at block 132, the container node 30 may receive an orchestration command from the master container node 62 or some other node that is part of the container orchestration system 24. The orchestration command may include an instruction regarding one or more containers that the control system 66 should currently be executing. As such, the orchestration command may be part of a monitor function that causes the container node 30 to verify that the machine state data of the control system 66 corresponds to an expected machine state, as specified by the deployment configuration file 65.

At block 134, the container node 30 may retrieve machine state data from the control system 66. The machine state data may include current operational state (e.g., active, inactive) of the respective OT device controlled by the control system 66, available processing resources (e.g., CPU availability), available memory resources (e.g., storage, RAM), and the like. The machine state data may also indicate whether any containers are being executed by the control system 66. As such, the machine state data may be reported back to the master container node 62 to ensure that the desired state specified by the deployment configuration file 65 is present.

To receive the machine state data, the container node 30 may send requests to the control system 66 via an appropriate OT communication protocol. In response to receiving the requests, the control system 66 may query a database, memory cell, or other suitable storage that may include information regarding the requested data. After retrieving the requested information, the control system 66 may send the requested data to the container node 30 using the same OT communication protocol on which it received the request.

In some embodiments, the container node 30 may be embedded or integrated into one or more cores of the control system 66. As such, the container node 30 may communicate data with portions of the control system 66 using onboard communication methodologies. Alternatively, the container node 30 may directly retrieve the machine state data from the respective memory locations.

After receiving the machine state data from the control system 66, the container node 30 may, at block 136, determine whether the control system 66 is operating at a desired state based on the deployment configuration file 65. In the present embodiment, the container node 30 may evaluate whether the control system 66 is executing the containers, as specified in the deployment configuration file 65. That is, since the container node 30 may execute the container daemon host, the container node 30 may participate in the management of the containers distributed throughout the container orchestration system 24 by monitoring the machine state data of the control system 66.

If the control system 66 is operating in the desired state, the container node 30 may proceed to block 138 and send the machine state data to the master container node 62. The master container node 62 may then check whether other container nodes 30 are achieving the desire states.

If, however, the container node 30 determines that the control system 66 is not operating in the desired state, the container node 30 may proceed to block 140 and generate a package that may cause the control system 66 to modify its operations to execute the corresponding pod and the containers therein. After generating the package, the container node 30 may send the package directly to the control system 66 to execute. In this way, the container node 30 operate in the passive-direct mode because the container node 30 may directly send commands that cause the control system 66 to change operations. For example, instead of the control system 66 periodically checking the filesystem, as described above with respect to FIG. 5 (e.g., passive-indirect mode), the control system 66 may directly interface with the container node 30 and receive commands that may cause it to adjust operations of a connected device (e.g., OT device), execute received packages, and the like. As such, the container node 30 may push packages, firmware updates, OT device credential updates, security updates, encryption keys, and other data to the control system 66 at any given time. That is, the container system 30 may generate an event notification that causes an API or other component of the control system 66 to react in response to detecting the event notification. In this way, the container node 30 may actively participate in the coordination of containers with a respective control system 66 based on orchestration commands received passively from the master container node 62 or the like.

By employing the container nodes 30 to enable the container orchestration system 24 to implement software containers on control systems 66, the present embodiments described herein may allow for coordinating control of a number of control systems 66 and a number of OT devices 67 to control operations in the industrial automation system 10. That is, desired machine states may include desired operating parameters for industrial equipment, and the container orchestration system 24 may monitor the available industrial equipment resources to ensure that the desired machine states are continuously being achieved by coordinating activities via the container nodes 30 communicatively coupled to the control systems 66.

In addition to operating in the passive-indirect mode and the passive-direct mode, the container node 30 may operate in an active mode, such that the container node may invoke container orchestration commands for other container nodes 30. For example, referring back to FIG. 3, a proxy node 32 may operate as a proxy or gateway node that is part of the container orchestration system 24. The proxy node 32 may be implemented in a sidecar computing module that has an operating system (OS) that supports the container host daemon. In another embodiment, the proxy node 32 may be implemented directly on a core of the control system 66 that is configured (e.g., partitioned), such that the control system 66 may operate using an operating system that allows the container node 30 to execute orchestration commands and serve as part of the container orchestration system 24. In either case, the proxy node 32 may serve as a bi-directional bridge for IT/OT orchestration that enables automation functions to be performed in IT devices based on OT data and in OT devices 67 based on IT data. For instance, the proxy node 32 may acquire OT device tree data, state data for an OT device, descriptive metadata associated with corresponding OT data, versioning data for OT devices 67, certificate/key data for the OT device, and other relevant OT data via OT communication protocols. The proxy node 32 may then translate the OT data into IT data that may be formatted to enable the master container node 62 to extract relevant data (e.g., machine state data) to perform scheduling operations and to ensure that the container orchestration system 24 and the connected control systems 66 are operating at the desired state. Based on the results of its scheduling operations, the master container node 62 may issue supervisory control commands to targeted OT devices via the proxy nodes 32, which may translate and forward the translated commands to the respective control system 66 via the appropriate OT communication protocol.

In addition, the proxy node 32 may also perform certain supervisory operations based on its analysis of the machine state data of the respective control system 66. As a result of its analysis, the proxy node 32 may issue commands and/or pods to other nodes that are part of the container orchestration system 24. For example, referring to FIG. 3, the proxy node 32 may send instructions or pods to other worker container nodes 68 that may be part of the container orchestration system 24. The worker container nodes 68 may corresponds to other container nodes 30 that are communicatively coupled to other control systems 70 for controlling other OT devices 71. In this way, the proxy node 32 may translate or forward commands directly to other control systems 70 via certain OT communication protocols or indirectly via the other worker container nodes 68 associated with the other control systems 70. In addition, the proxy node 32 may receive replies from the control systems 70 via the OT communication protocol and translate the replies, such that the nodes in the container orchestration system 24 may interpret the replies. In this way, the container orchestration system 24 may effectively perform health checks, send configuration updates, provide firmware patches, execute key refreshes, and provide other services to OT devices 71 in a coordinated fashion. That is, the proxy node 32 may enable the container orchestration system to coordinate the activities of multiple control systems 66 and 70 to achieve a collection of desired machine states for the connected OT devices 67 and 71.

Implementing Serverless Functions in Industrial Control Systems Using Container Orchestration Systems In addition to coordinating the communication between the IT system and the OT system, the container orchestration system 24 may also be used to implement functions-as-a-service (FaaS) operations or serverless functions using the embodiments described herein. More specifically, the master container node 62 may distribute FaaS operations across one or more control systems 70 using respective worker container nodes or the like. In this way, the container orchestration system 24 may leverage the available resources of the control systems 70 in the OT space to coordinate various OT operations.

By way of introduction, serverless functions or FaaS operations corresponds to a computing scheme that allows certain logic or applications (e.g., packages, containers) be executed without regard to the available computing resources available on a respective device. In other words, regardless of the current state (e.g., CPU availability, memory availability, line availability, device availability) of a control system 66, the master container node 62 may identify a worker container node 68 and/or a control system 70 to host and/or execute an application. The FaaS operations may, in some embodiments, be triggered based on an asynchronous event that occurs in another system (e.g., control system 70). For example, the master container node 62 monitor incoming messages from other container nodes of the container orchestration system 24 for events, triggers, or notifications that may cause a FaaS operation to execute. Additionally, the master container node 62 may monitor shared filesystems for new files, rows added to database tables, data added to a database, or the like. The master container node 62 may also listen for API endpoint calls (e.g., GET, POST, PUT, Delete) or any other suitable triggering event. In any case, the master container node 62 may employ a function (e.g., executing application) that continuously (e.g., periodically) monitors an external system for a change of state that corresponds to causing another application to execute.

Figure 7:
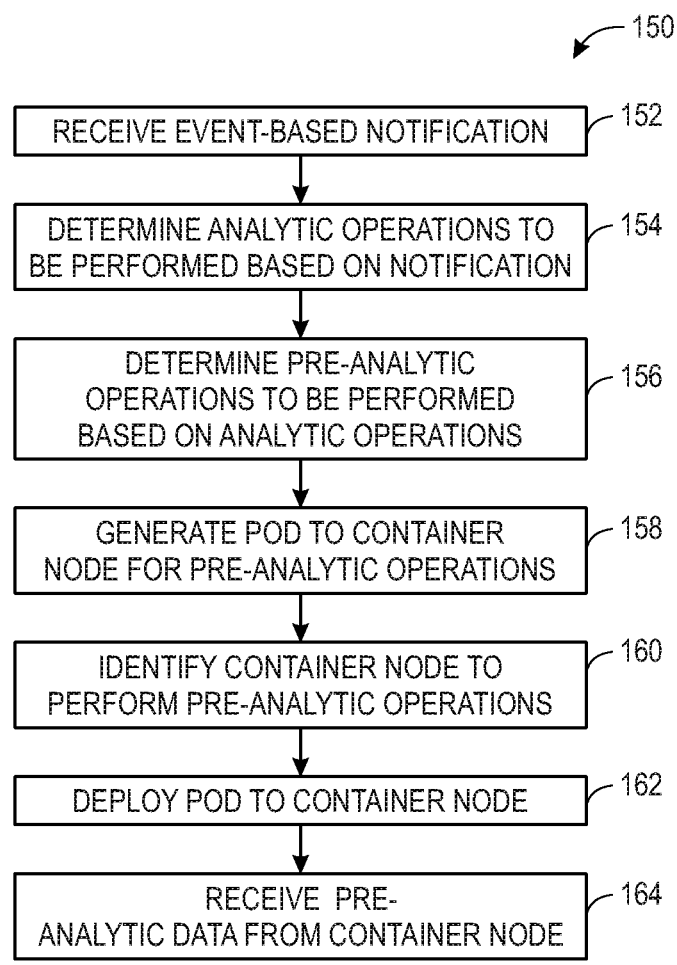
FIG. 7 is a flow chart of a method for coordinating analytic operations in industrial control systems using the container orchestration system, in accordance with an embodiment.

Keeping this in mind, FIG. 7 illustrates a method 150 for performing an example FaaS operation using the embodiments described herein. By way of example, the method 150 described below will be detailed as being performed by the master container node 62. However, it should be noted that any suitable container node capable of coordinating activities of nodes in the container orchestration system 24, such as the proxy node 32, may perform the method 150. In addition, although the following description of the method 150 is described in a particular order, it should be understood that the method 150 may be performed in any suitable order.

Referring now to FIG. 7, the master container node 62 may, at block 152, receive an event-based notification from the container node 30, the worker container node 68, or other suitable node in the container orchestration system 24. In some embodiments, the event-based notification may be related to condition or state that corresponds to the control system 66, the OT device 67, or the like. As such, the event-based notification may correspond to a state that meets some condition, exceeds some threshold, falls below some threshold, or the like. For instance, the event-based notification may be related to conditions related to computing properties (e.g., CPU availability) associated with the control system 66, machine availability (e.g., available, unavailable) of the OT device 67, or other variables being detected by the control system 66. As such, the event-based notification may be generated by the control system 66 and reported to the container node 30, which may translate the event-based notification into a format that may be interpretable by the master container node 62.

At block 154, the master container node 62 may determine analytic operations or logic operations that are to be performed based on the event-based notification. That is, the master container node 62 may monitor for the event-based notification, which may cause the master container node 62 to execute an application or function (e.g., container) in response to receiving the event-based notification. In some embodiments, the invoked function may involve performing certain analytic operations for data stored on various devices (e.g., OT devices, control systems). For example, if the event-based notification is related to the OT device 67 overheating or the respective control system 66 detecting a temperature associated with the OT device 67 exceeding a threshold, the master container node 62 may perform analytic operations to determine the average increase in temperature for a number of OT devices for some period of time (e.g., 24 hours).

To perform the analytic operations, the master container node 62 may identify one or more functions (e.g., equations, processes), one or more variables, and other data elements that may be involved in performing the analytics. In some embodiments, the master container node 62 may execute a container in response to receiving the event-based notification, and the container may include relevant information regarding the analytic operations to be performed, the functions used to perform the analytic operations, the variable or data involved for completing the analytic operations, and the like. Part of the information or data that may be used to perform the analytic operations may include pre-analytic data. The pre-analytic data may include certain datasets that have been pre-processed or collected to facilitate the higher-level analytic operations. Referring again to the example provided above, to determine the average increase in temperature for a number of OT devices, the pre-analytic data may include an average increase in temperature for one OT device over the period of time.

With this in mind, the container employed to perform the analytic operations may cause the master container node 62 to determine whether other nodes of the container orchestration system 24 may perform certain pre-analytic operations. Alternatively, the container may include a list of commands or instructions for other container nodes 30 to perform the respective pre-analytic operations. In any case, based on the instructions provided by the respective container, the master container node 62 may, at block 156, determine the pre-analytic operations that are related to the analytic operations determined at block 154.

After determining the pre-analytic operations to be performed by various container nodes 30 or other industrial control systems 66, the master container node 62 may, at block 158, generate or retrieve one or more pods for deployment to one or more container nodes 30. The pods may include executable instructions that cause the respective container nodes 30 to retrieve the respective container images 28 associated with the pods, as described above with respect to FIG. 4. In some embodiments, the pods may be stored as part of the container that specifies the container nodes 30 and/or the control systems 66 that may perform the respective pre-analytic operations.

In some embodiments, prior to deploying the pods, the master container node 62 may, at block 160, identify the control system 66 that may perform the pre-analytic operations. That is, the master container node 62 may schedule the deployment of the pods based on the constraints associated with the container orchestration system 24. For instance, the master container node 62 may confirm that deploying the pods and causing the respective control system 66 to perform the pre-analytic operations would still allow the control system 66 to maintain a machine state that corresponds to defined constraints of the deployment configuration file 65. As such, the master container node 62 may schedule the deployment of the pod at a specific time or such that the pod invokes the control system 66 at a time in which the control system 66 may perform the pre-analytic operations while preserving a desired machine state. If a respective container node 30 indicates to the master container node 62 that the control system 66 may not be able to perform the pre-analytic operations, the master container node 62 may deploy other pods to one or more other container nodes 68 to retrieve raw data from the unavailable control system 66 (e.g., via one or more intermediate container nodes 30), such that other control systems 70 may perform the pre-analytic operations. Indeed, the master container node 62 may confirm that the other control systems 70 may perform the respective pre-analytic operations based on the respective machine state data received via the respective other container nodes 68. As such, the coordination of the pre-analytic operation commands may be facilitated by the master container node 62 and its native scheduling operations as part of the container orchestration system 24.

After identifying the appropriate container node 30, the master container node 62 may send the pod to the respective container node 30. The container node 30 may then pull the container image associated with the received pod and store an associated package on the filesystem shared with the control system 66 or send the package directly to the control system 66 (e.g., via passive-direct mode, active mode operation) to implement.

After the control system 66 performs the pre-analytic operations and acquires the pre-analytic data, the master container node 62 may, at block 164, receive the pre-analytic data from the container node 30. As discussed above, the container node 30 may receive the pre-analytic data via OT communication protocols and translate the received data into a format interpretable by the master container node 62. Since the pre-analytic data is processed close to the source of the data and organized as the pre-analytic data, the amount of data that is sent to the master container node 62 is less than the raw data that was analyzed to obtain the pre-analytic data. As such, the container orchestration system 24 may reduce the amount or volume of network traffic transmitted across the nodes of the container orchestration system 24 by using the control systems 70 to process raw data and transmit the smaller pre-analyzed data results.

With this in mind, the present embodiments enable the container orchestration system 24 to implement serverless functions in the industrial automation environment by coordinating various data processing operations across different control systems 70. As a result, users and/or developers from different domains (e.g., IT domain and OT domain) may create joint solutions using their respective tools in their respective environments. For instance, control engineers that work with control systems 60 may use languages like Ladder Logic or Function Block to create robust control programs, while IT Engineers may use languages like Python or JavaScript to create analytic or integration solutions. The container orchestration system 24 may coordinate the deployment of tasks across different domains while maintaining desired machine states across the IT domain and the OT domain. In this way, the container orchestration system 24 allows each developer to build their part of the solution without sacrificing the strengths of their respective tools or becoming overly knowledgeable with the other's domain. Further by employing the control systems 70 (e.g., controller or other compute surface/sidecar in chassis) to perform certain functions (e.g., IT operations), the present embodiments described herein may reduce the complexity associated with networking connections between various devices (e.g., OT devices and IT devices) and providing security across the communications by leveraging certain OT communication protocols. Moreover, by coordinating the operations across the control systems 70 of the industrial control system 12, the container orchestration system 24 may improve the reliability and availability of the generated data by scheduling operations according to available resources and desired machine states.

Since the master container node 62 deploys functions in a container (e.g., making it serverless), the container orchestration system 24 absolves the IT developer from having to understand the infrastructure that the function runs on. Further, since the function's logic runs in a container, the control engineer is unconcerned with the additional processing changing the performance or behavior of the implemented control program. As a result, the present embodiments described herein provide a robust computing architecture that leverages the control systems 70 that are available in the industrial control system 12 with the lifecycle management operations the container orchestration system 24 to efficiently coordinate data analytic operations, machine control operations, line control operations, and the like. By way of example, the container orchestration system 24 may push analytic operations to be performed as close to the source of the data inputs and make the results of which available for downstream analytics. Additionally, the container orchestration system 24 may shape data for consumption by other services, use GraphQL to generate user-friendly schema for graphical representation, provide access to 3rd party systems (e.g., call a web service, access a database), and perform other operations in the IT domain. Moreover, the container orchestration system 24 may coordinate OT operations, such as obtaining recipe data from a control system 66 for a batch process, logging information to an MES application, reporting detected anomalies of the OT device, tracking ingredient consumption for inventory and quality, and the like. Indeed, the OT data may be made available to IT devices for data processing via the container orchestration system 24, thereby leveraging the data processing capabilities of the IT devices for OT data.

Providing Rolling Updates in Industrial Control Systems Using Container Orchestration Systems In addition to pushing analytic operations to control systems, the present embodiments may be employed to provide rolling updates to control systems 66, OT devices 67, and other suitable components that may be present in the industrial system 10, the industrial control system 12, or the like. In the industrial environment, software patches, firmware updates, and other updates are implemented by the control systems 66 while the respective OT device 67 are offline. That is, in order to update the control system 66 or the OT device 67, the control system 66 and/or the OT device 67 may be placed offline prior to the update being implemented on the respective device. In the industrial automation system 10, placing a component offline may directly affect production in that fewer online OT devices 67 may reduce the production rate or efficiency of the industrial system 10.

Keeping this in mind, the container orchestration system 24 described herein may coordinate the update distribution across the components of the industrial system 10 to ensure that the components are updated while maintaining a desired state for the industrial system 10. That is, the deployment configuration file 65 for distributing an update may include desired state data that indicates a number of each control system 66 and/or OT device 67 that may remain operating at any given time. In some embodiments, to implement the following methodology for providing updates, redundant control systems 66 and/or OT devices 67 may be available to allow the container orchestration system 24 to shift operations between components to update certain components while they are offline and keep other components online to perform their respective operations. Additionally, the container orchestration system 24 may schedule the deployment of updates based on an expected operation schedule for the respective control systems 66 and/or OT devices 67. That is, the container orchestration system 24 may monitor the operational pattern of for the respective control systems 66 and/or OT devices 67 and schedule the deployment of the respective pods for updating the components during a time period in which the components are scheduled to be offline. In any case, the present embodiments described herein enable updates to be provided to components in the industrial system 10 in a coordinated fashion based on available resources and desired states to ensure that the industrial system 10 continues to operate according to a desired protocol.

Figure 8:
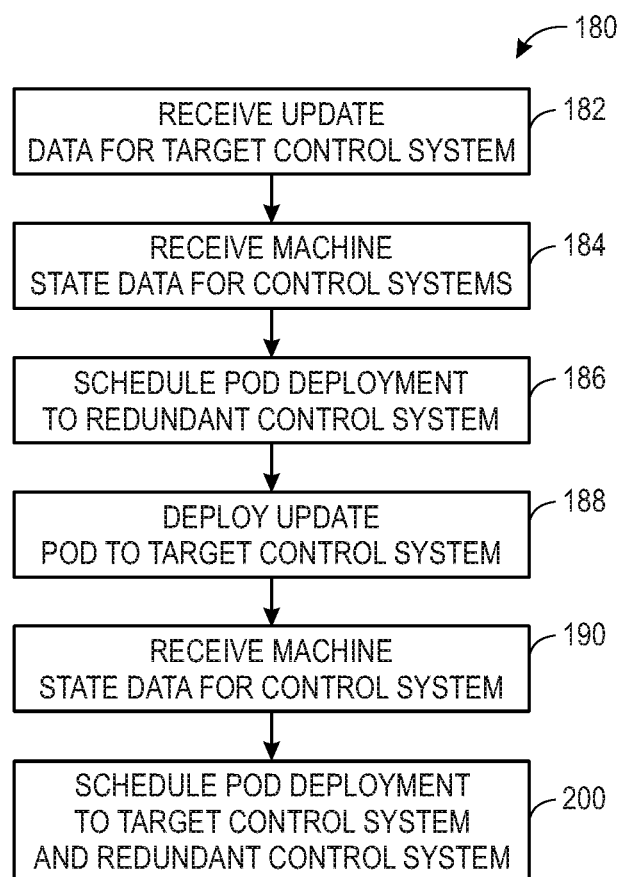
FIG. 8. is a flow chart of a method for coordinating rolling updates in industrial control systems using the container orchestration system, in accordance with an embodiment.

By way of example, FIG. 8 illustrates a flowchart of a method 180 that the master container node 62 of the container orchestration system 24 may employ to distribute updates to the control system 66 and/or the OT device 67. Like the methods described above, although the method 180 is described as being performed by the master container node 62 and in a particular order, it should be understood that the method 180 may be performed by any suitable computing system or node in the container orchestration system 24 in any suitable order.

Referring now to FIG. 8, at block 182, the master container node 62 may receive update data for a target control system 66. The update data may be provided via the deployment configuration file 65 or via a command input by a user of the container orchestration system 24. The update data may include software updates, controller updates, firmware updates, or other type of update that may modify the operation of the target control system 66 and/or the OT device 67. In addition, the update data may include an indication of the target control system 66 and/or the target OT device 67 that may implement the update. In some embodiments, the update data may also include desired machine state data for the collection of control systems 66 and/or OT devices of the industrial system 10. The desired machine state data may include a number of control systems 66 and/or OT devices 67 and corresponding desired operating states for the respective components. As such, the master container node 62 may analyze the components of the industrial system 10 to ensure that the desired machine states are maintained while providing the update to the target control system 66 and/or OT device 67.

At block 184, the master container node 62 may receive the machine state data for the target control system 66 and the other control systems 70 and/or associated OT devices 67 that are part of the industrial control system 12 and visible to the container orchestration system 24. As such, the master container node 62 may send requests for machine states data for the respective components to the target container node 30, the container nodes 68, and or proxy node 32 that are communicatively coupled to the target control system 66 and the other control systems 70. The machine state data may include data regarding the availability of certain computing resources (e.g., memory, processing power) of the respective control systems 66 and 70. In addition, machine state data may also include information regarding the processes and/or containers being executed by the control systems 66 and 70. Further, the machine state data may also include information related to an operational state (e.g., mode of operation, status) of the connected OT devices 67.

Based on the machine state data of the control systems 66 and 70 and/or the OT devices 67, the master container node 62 may schedule pod deployments to the target control system 66 and redundant control systems 70. The redundant control systems 70 may include any suitable control system 70 that may interface and communicate with the target OT device 67. As such, the pods may be related to suspending the operations of the respective control systems 70 and/or the respective OT devices 67. In addition, the pods may be related to performing the suspended operations of the respective control systems 70 and/or the respective OT devices 71 using the redundant control systems 70.

In some embodiments, the master container node 62 may monitor the machine state data of the control systems 66 and 70 and may maintain a list of OT devices 67 that are present in the industrial system 10. Using this list, the master container node 62 may identify control systems 79 or OT devices 67 that may replace the operations of the target control system 66 and/or the target OT device 67. After identifying the suitable control systems 70 and/or OT devices 67, the master container node 62 may analyze the respective machine state data to identify suitable control systems 70 and/or OT devices 67 to use as replacement control systems 70 and/or OT devices 71. In some embodiments, the replacement control systems 70 and/or OT devices 71 may correspond to redundant control systems and/or OT devices that may be reserved for performing operations when the target control system 66 and/or the target OT device 67 are unavailable. As such, the replacement control systems 70 and/or OT devices 71 may be identified as components that may be used to perform the respective operations of the target control system 66 and/or OT device 67 while the target control system 66 and/or OT device 67 are updated.

Additionally, the replacement control systems 70 and/or OT devices 71 may correspond to other control systems and/or OT devices that may currently being used for certain operations but may also be configured to perform additional operations. That is, some control systems may include sufficient processing and computing resources to control multiple OT devices. As such, the master container node 62 may receive machine state data from these control systems via the respective container nodes to determine whether they will be able to perform the operations of the target control system 66 and/or OT device 67.

After identifying the replacement control systems 70 and/or OT devices 71, the master container node 62 may, at block 186, schedule the deployment of pods to the identified components to continue operations that are currently being performed by the target control system 66 and/or the OT device 67. In addition to sending the pods to the identified components, at block 188, the master container node 62 may deploy an update pod to the target control system 66 and/or OT device 67 to cause the target control system 66 and/or OT device 67 to halt operations and receive one or more respective updates. In some embodiments, the master container node 62 may schedule the deployment of pods, such that the replacement control systems 70 and/or OT devices 71 assume the responsibilities of the target control system 66 and/or OT device 67 after they halt operations. That is, the master container node 62 may coordinate the operations of the target control system 66 and/or OT device 67 to stop, while the replacement control systems 70 and/or OT devices 71 take over the corresponding operations. The master container node 62 may coordinate the transfer to ensure that the OT devices continue performing the functions of the industrial system 10.

After deploying the pods to the replacement control systems 70 and/or OT devices 71 and the target control system 66 and/or OT device 67, at block 190, the master container node 62 may again receive the machine state data for the control systems and/or OT devices accessible to the master container node 62. As such, the master container node 62 may receive updated machine state data after the pods have been deployed to the redundant control systems 70 and/or OT devices 71 and the target control system 66 and/or OT device 67. The master container node 62 may verify that the industrial system 10 is achieving the desired machine states for the various components therein.

Based on the updated machine state data, at block 200, the master container node 62 may again schedule the deployment of pods to the redundant control systems 70 and/or OT devices 71 and the target control system 66 and/or OT device 67. That is, if the machine state data for the industrial system 10 does not correspond to the desired states, the master container node 62 may send additional pods to the redundant control systems 70 and/or OT devices 71 to modify their respective operations to achieve the desired machine states. If however, the machine state data is indicative of the update being completed, the master container node 62 may schedule the deployment of pods to the redundant control systems 70 and/or OT devices 71 and the target control system 66 and/or OT device 67, such that the redundant control systems 70 and/or OT devices 71 halt its respective operations and the target control system 66 and/or OT device 67 resume the operations previously performed prior to receiving the update pod. In some embodiments, the master container node 62 may allow the redundant control systems 70 and/or OT devices 71 to maintain their current machine states and keep the target control system 66 and/or OT device 67 available as redundant components of the industrial system 10. In any case, the master container node 62 may update the list of components of the industrial system 10 and the industrial control system 12 to represent the current configuration of each component.

By employing the container orchestration system 24 to perform update operations on the components of the industrial system 10, the present embodiments described herein enable the industrial system 10 to continue operations without reducing uptime or efficiency in production. Indeed, other update methodologies involve powering off components, thereby reducing the efficiency of the production or operations of the industrial system 10. Moreover, updates may involve performing tasks in a design-time environment when the respective component (e.g., control system) is disengaged from coordinating operations performed by the respective OT device. With this in mind, the container orchestration system 24 coordinates the update process in the run-time environment while the components continue to perform their respective operations. Indeed, the operations of various components may be shifted among the available resources in the industrial system 10, but the operational tasks of the industrial system 10 remain online and thus the productivity of the industrial system 10 remains the same.

In addition to providing rolling updates, the container orchestration system 24 may also perform other high availability operations, such as periodically testing the health of the industrial control system 12 or any suitable control system 66/70 and communicating the detected health back to the master container node 62. Should a health check fail, the master container node 62 may initiate a new control process pod be started via that proxy node 32 that corresponds to the unhealthy control system 66/70, OT device 67/71, or the like. Alternatively, the master container node 62 may identify another suitable proxy node 32 and initiate a new control process pod via that proxy node 32, thus replacing the failed component and maintaining control system availability for the respective OT device 67/71.

While only certain features of the presently disclosed embodiments have been illustrated and described herein, many modifications and changes will occur to those skilled in the art. It is, therefore, to be understood that the appended claims are intended to cover all such modifications and changes as fall within the true spirit of the embodiments described herein.

The invention claimed is:

1. A system, comprising:
   a plurality of control systems for controlling a plurality of operations of a plurality of operational technology (OT) devices;
   a first computing node of a cluster of computing nodes that are part of a container orchestration system, wherein the first computing node comprises a first processor and is configured to:
   receive an event-based notification from a second computing node of the cluster of computing nodes, wherein the second computing node comprises a second processor and is associated with a first control system of the plurality of control systems and a first OT device of the plurality of OT devices;
   determine one or more analytic operations to be performed based on the event- based notification;
   determine one or more pre-analytic operations to be performed by one or more of the plurality of control systems based on the one or more analytic operations;
   retrieve a plurality of machine state datasets from the plurality of control systems via a portion of the cluster of computing nodes, wherein each of the plurality of machine state datasets correspond to an operational state associated with each of the plurality of control systems, each of the plurality of OT devices, or both;
   identify a second control system as a suitable host to perform the one or more pre-analytic operations based on the plurality of machine state datasets; and
   transmit a pod to a third computing node associated with the second control system, wherein the pod is configured to cause the third computing node to perform the one or more pre-analytic operations, and wherein the third computing node comprises a third processor.

2. The system of claim 1, wherein the first computing node is configured to coordinate an automatic process for managing or scheduling deployment of one or more containers of a plurality of containers for execution across the plurality of control systems via the cluster of computing nodes.

3. The system of claim 2, wherein each of the plurality of containers comprises one or more applications and one or more runtime dependencies associated with each of the one or more containers.

4. The system of claim 1, wherein the event-based notification is generated by an application programming interface (API) of the first control system, wherein the API is configured to monitor one or more events associated with the first OT device.

5. The system of claim 1, wherein the first computing node is configured to identify the second control system as the suitable host based on the plurality of machine state datasets as compared to a plurality of desired machine states.

6. The system of claim 1, wherein the one or more pre-analytic operations are used by the first computing node to perform the one or more analytic operations.

7. The system of claim 1, wherein the first computing node is configured to:
   receive one or more datasets associated with the one or more pre-analytic operations from the second control system via the third computing node.

8. The system of claim 7, wherein the third computing node is configured to transmit the one or more datasets via an operational technology (OT) communication protocol.

9. The system of claim 1, wherein the second computing node is configured to translate the event-based notification into a format that is interpretable by the first processor-based node.

10. The system of claim 1, wherein, the pod comprises:
    an indication of a location of an image file in a registry; and
    executable instructions configured to cause the third computing node to retrieve the image file from the registry.

11. A method, comprising:
    receiving, via a first computing node of a cluster of computing nodes in a container orchestration system, a pod from a second computing node in the cluster of computing nodes;
    retrieving, via the first computing node, an image file comprising one or more containers from a registry, wherein the pod comprises an indication of a location of the image file in the registry, wherein the one or more containers comprise one or more pre-analytic operations for a control system of a plurality of control systems to perform, and wherein the one or more pre-analytic operations are part of one or more analytic operations to be performed by the second computing node;
    generating, via the first computing node, a package based on the one or more containers; and
    storing, via the first computing node, the package in a filesystem shared with the control system.

12. The method of claim 11, comprising sending, via the first computing node, the package directly to the control system.

13. The method of claim 12, comprising sending the package directly to the control system via an operational technology (OT) communication protocol.

14. The method of claim 11, wherein the pod is received via an information technology (IT) communication protocol.

15. The method of claim 11, comprising:
    receiving, via the first computing node, one or more datasets associated with the pre-analytic operations from the control system via an OT communication protocol; and
    sending, via the first computing node, the one or more datasets to the second computing node via an IT communication protocol.

16. A non-transitory computer-readable medium comprising computer-executable instructions that, when executed, are configured to cause a processor to perform operations comprising:
    receiving an event-based notification from a first computing node of a cluster of computing nodes that are part of a container orchestration system, wherein the first computing node is associated with a first control system of a plurality of control systems and a first OT device of a plurality of operational technology (OT) devices operating in an industrial system;

determining a first set of operations to be performed based on the event-based notification;

determining a second set of operations to be performed by one or more of the plurality of control systems based on the first set of operations;

retrieving a plurality of machine state datasets from the plurality of control systems via a portion of the cluster of computing nodes, wherein each of the plurality of machine state datasets correspond to an operational state associated with each of the plurality of control systems, each of the plurality of OT devices, or both;

identifying a second control system as a suitable host to perform the second set of operations based on the plurality of machine state datasets; and transmitting a pod to a second computing node associated with the second control system, wherein the pod is configured to cause the second computing node to perform the second set of operations.

17. The non-transitory computer-readable medium of claim 16, wherein each of the plurality of machine state datasets correspond to an amount of computing resources available on a respective control system of the plurality of control systems.

18. The non-transitory computer-readable medium of claim 17, wherein the first control system is configured to control an operational technology (OT) device, wherein the OT device comprises motor control centers, motors, human machine interfaces (HMIs), operator interfaces, contactors, starters, sensors, drives, relays, protection devices, switchgear, compressors, network switches, or any combination thereof that operate in an OT domain.

19. The non-transitory computer-readable medium of claim 16, wherein the first control system and the second control system are the same.

20. The non-transitory computer-readable medium of claim 16, wherein the event-based notification is generated by an application programming interface (API) of the first control system, wherein the API is configured to monitor one or more events associated with the first OT device.

* * * * *